Patented Oct. 24, 1944

2,361,070

UNITED STATES PATENT OFFICE 2,361,070

METHOD OF PRESERVING LATEX AND PRODUCT THEREOF

William D. Stewart, Akron, Ohio, assignor to The B. F. Goodrich Company, New York, N. Y., a corporation of New York No Drawing. Application December 21, 1940, Serial No. 371,204

10 Claims. (Cl. 260—820)

This invention relates to a method of preserving latex, particularly fresh latex, and to the product thereof.

Latex that has been freshly-collected from the rubber trees contains enzymes that, together with the bacteria picked up in handling the latex, cause the latex to putrefy and coagulate within a relatively short time. Various methods of preserving the latex have been proposed in the past, such as the ammonia treatment now commonly used, but all these have been only generally effective and all have been more or less unsatisfactory.

I have discovered a method of preserving latex, particularly freshly-collected latex, that produces a sterile, stable latex that will stand for long periods without putrefaction or coagulation. By the method of this invention the pH of the latex is adjusted to a point not less than 9.8 nor more than 10.0 by means of buffer solutions, alkalies, or the like. The preferred manner is by adding ammonia to the latex in from 0.25% to 0.35% by weight of the latex. To this latex is then added small quantities of one or more of the slightly soluble compounds of the heavy metals preferably within not more than eighteen hours after the latex has been collected from the trees. These compounds are preferably used in quantities slightly exceeding the solubility of the compounds in the latex. The compounds may be added either before or after the pH of the latex has been adjusted to the specified range of 9.8 to 10.0 and if necessary the pH may be readjusted after addition of the compound or compounds.

The term "heavy metals" is to be understood as indicating all metals except the alkali metals and the alkaline earth metals although the amphoteric heavy metals such as aluminum, zinc, antimony, and iron may be used in the form of alkali metal salts such as ammonium zincate, potassium ferricyanide, and sodium antimoniate. As used herein the expression "slightly soluble compounds" means generally those compounds that have a solubility of not over 0.50% by weight of the latex. The metal compounds may be either organic or inorganic and examples are the zinc-amines, the mercuri-amines, the oxides of mercury and lead, mercuric iodide, sodium antimoniate, potassium aluminates, chelated compounds such as potassium ferricyanide, ammonium zincate, potassium zincate, and the like.

As a specific example of this invention ammonia is added to freshly-collected latex until the pH is raised to between 9.8 and 10.0. 0.10% of zinc hydroxide by weight of the latex is mixed with sufficient aqueous ammonia to dissolve the zinc hydroxide, forming an ammonium zincate, and this zincate solution is then added to the latex. As alternate procedures zinc dust may be added to a strong alkali such as aqueous ammonia to form the zincate, or zinc oxide may be used with the alkali to form the zincate.

I have found through numerous experiments that raising the pH of the latex to within the relatively narrow range of 9.8 to 10.0 and then treating the latex with a heavy metal compound such as a zincate produces a preserved latex that will remain sweet and unchanged over long periods of time with no danger of coagulation and putrefaction. This method of preserving latex is likewise applicable to preserving latex that is not freshly-collected but that has been preserved by other means although the method is more specific to the preservation of freshly-collected latex.

As will be apparent from the foregoing the preserved latex prepared according to this invention ordinarily will contain only the natural latex itself and the ammonia or other material added in adjusting the pH together with the heavy metal compounds as described. Any of the usual compounding or conditioning agents may later be added as desired to prepare the latex for specific uses but such materials preferably are not added at the plantation.

Having disclosed my invention it is my desire to protect it broadly within the spirit and scope of the appended claims.

I claim:

1. The method of preserving latex which comprises adjusting the pH of the latex to not less than 9.8 nor more than 10.0 and adding a small proportion of a zincate, said materials being added within not more than eighteen hours after collection of the latex from the trees.

2. The method of preserving freshly-collected latex which comprises adjusting the pH of the latex to not less than 9.8 nor more than 10.0 and adding a small proportion of a zincate dissolved in an alkali, said materials being added within not more than eighteen hours after collection of the latex from the trees.

3. The method of preserving freshly-collected latex which comprises adding sufficient alkali to the latex to raise the pH to not less than 9.8 nor more than 10.0 and adding a small proportion of a zincate dissolved in an alkali, said materials being added within not more than eighteen hours after collection of the latex from the trees.

4. The method of preserving freshly-collected latex which comprises adding sufficient ammonia to the latex to raise the pH to not less than 9.8 nor more than 10.0 and adding a small proportion of a zincate dissolved in aqueous ammonia, said materials being added within not more than eighteen hours after collection of the latex from the trees.

5. The method of preserving freshly-collected latex which comprises adding sufficient ammonia to the latex to raise the pH to not less than 9.8 nor more than 10.0 and adding not more than 0.50% by weight of the latex of a zincate dissolved in aqueous ammonia, said materials being added within not more than eighteen hours after collection of the latex from the trees.

6. The method of preserving freshly-collected latex which comprises adding sufficient alkali to the latex to raise the pH to not less than 9.8 nor more than 10.0 and adding a small proportion of zinc hydroxide in an alkali, said materials being added within not more than eighteen hours after collection of the latex from the trees.

7. The method of preserving freshly-collected latex which comprises adding sufficient ammonia to the latex to raise the pH to not less than 9.8 nor more than 10.0 and adding a small proportion of zinc hydroxide in aqueous ammonia, said materials being added within not more than eighteen hours after collection of the latex from the trees.

8. The method of preserving freshly-collected latex which comprises adding sufficient ammonia to the latex to raise the pH to not less than 9.8 nor more than 10.0 and adding not more than 0.50% by weight of the latex of zinc hydroxide dissolved in aqueous ammonia, said materials being added within not more than eighteen hours after collection of the latex from the trees.

9. Preserved latex having a pH not less than 9.8 nor more than 10.0 and containing ammonia and a small proportion of a zincate.

10. Preserved latex having a pH not less than 9.8 nor more than 10.0 and containing ammonia and not more than 0.50% by weight of the latex of a zincate.

WILLIAM D. STEWART.